United States Patent [19]

International Research and Development Company Limited

[11] 4,003,513
[45] Jan. 18, 1977

[54] EXPLOSIVE WELDING

[75] Inventor: Michael Dickenson Chadwick, Newcastle upon Tyne, England

[73] Assignee: International Research & Development Company Limited, Newcastle-upon-Tyne, England

[22] Filed: Aug. 25, 1975

[21] Appl. No.: 607,670

[30] Foreign Application Priority Data

Aug. 28, 1974 United Kingdom ............ 37642/74

[52] U.S. Cl. ................................ 228/107; 228/2.5
[51] Int. Cl.² ........................................ B23K 19/00
[58] Field of Search ........... 228/107, 108, 109, 2.5; 29/421 E

[56] References Cited

UNITED STATES PATENTS

| 3,503,110 | 3/1970 | Berry et al. | 228/108 X |
| 3,543,370 | 12/1970 | Berman et al. | 228/107 X |
| 3,562,887 | 2/1971 | Schroeder et al. | 228/107 X |

Primary Examiner—Al Lawrence Smith
Assistant Examiner—Margaret Joyce
Attorney, Agent, or Firm—Robert F. O'Connell

[57] ABSTRACT

In a method of explosively welding a metal pipe into a bore in another metal member, such as tube plate or another pipe, the explosive charge is surrounded by a body of impacting medium which is spaced from the inner surface of the pipe wall so that upon detonation of the explosive the impacting medium reaches a high velocity, without disintegrating, before it strikes the pipe wall to effect expansion thereof.

10 Claims, 5 Drawing Figures

EXPLOSIVE WELDING

This invention relates to the welding of metal pipes to other metal members using explosives and is particularly, although not exclusively, applicable to the joining of pipe lines for the distribution of liquids such as oil or gas, as well as the joining of tubular members to flanges or the like.

One problem encountered in the welding of large diameter pipes is the large degree of ovality which may be about 1% of the diameter. In our British Patent No. 1,297,708 a solution, involving an inflatable charge, is provided and whilst this has proved to be satisfactory, there are some situations where speed and the problems of access as well as material costs dictate simpler methods.

In our British Pat. No. 1,280,451 there is disclosed and claimed a method of welding a tube into a tube plate by means of an explosive charge wherein either the wall of the tube or else a metallic member surrounding the charge is tapered. This present invention is a development of that invention which, although applicable to the welding of pipes to pipes, is not, however, restricted to this application.

According to the present invention a method of explosively welding a metal pipe to a metal member comprises locating the pipe within a bore in the metal member, a clearance being provided between the outside of the pipe and the bore in the metal member, centrally locating a spatially separate body of impacting medium, hereinafter referred to as an impactor containing an explosive charge and detonating the explosive charge which imparts a high velocity to the impactor such that a sufficiently high velocity is in turn imparted to the wall of the pipe to form a weld between the outside surface of the pipe and the inside surface of the bore of the metal member.

The impactor should be distinguished from the transmitting medium known in previous explosive welding techniques, thus the transmitting medium is placed in intimate contact with one of the metal members to be welded whereas in this present invention spatial separation between the impactor and the metal members is deliberately introduced and is essential in order to allow the impactor to reach the maximum velocity, obtained from the explosive charge, before impact with the metal member.

The impactor may be in the form of a generally cylindrical plug of a material of a plastic nature and having the ability to resist fragmentation at least up to the time of impact and which may be easily removed from the pipe, such materials include polythene and rubber and other similar materials.

The impactor may be contained within a thin metal sheath to prevent extrusion of the impactor material through a gap between two pipes, to permanently seal this gap and also to assist in the impacting process.

The impactor may preferably be in the form of a conical plug.

The impactor may be held spatially from the inside wall of the pipe member by separators in the form of circumferential rings, or else the impactor may have a centralising body portion beyond the weld region for maintaining the spatial separation in the impacting region.

A segmented anvil may be employed to absorb the force of the explosive on detonation and to prevent excessive distortion of the weld region.

In a further embodiment the metal member may be a tube plate which may have a plurality of bores for the reception of a plurality of pipes or tubes to be welded into the bores in the tube plate.

The method of explosive welding may be conducted with the pipe or pipes in a horizontal or vertical disposition.

The explosive charge may be initiated by a local or remote detonator.

Embodiments in accordance with the invention, by way of example only, will now be described with reference to the accompanying drawings, in which.

Figure 1:
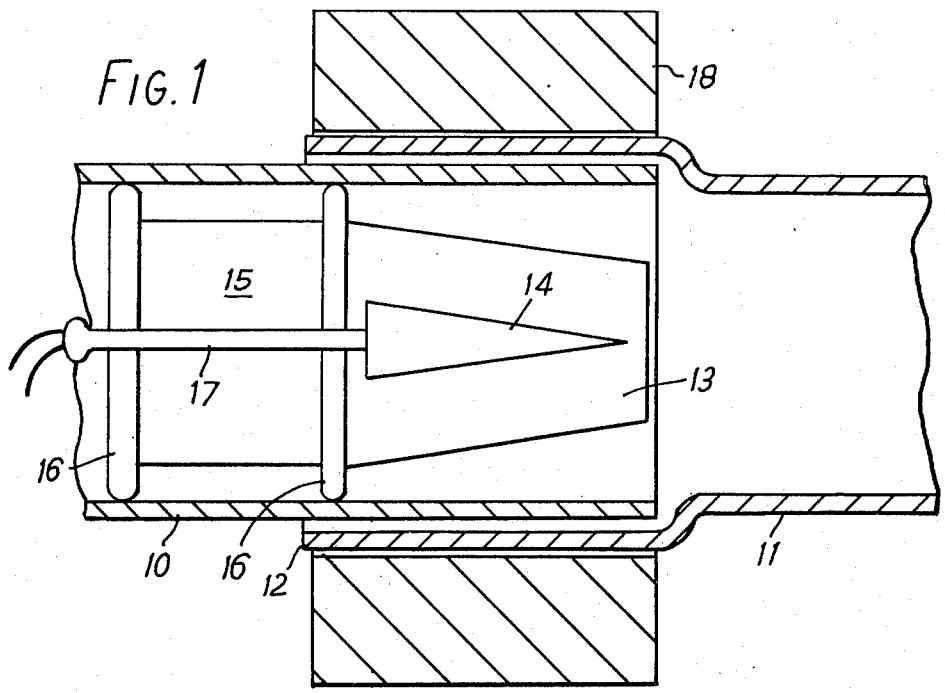
FIG. 1 shows a diagrammatic cross-section of a pipe-to-belled pipe arrangement for explosively joining in accordance with the method of the invention in which the pipes are in a horizontal disposition.
Figure 2:
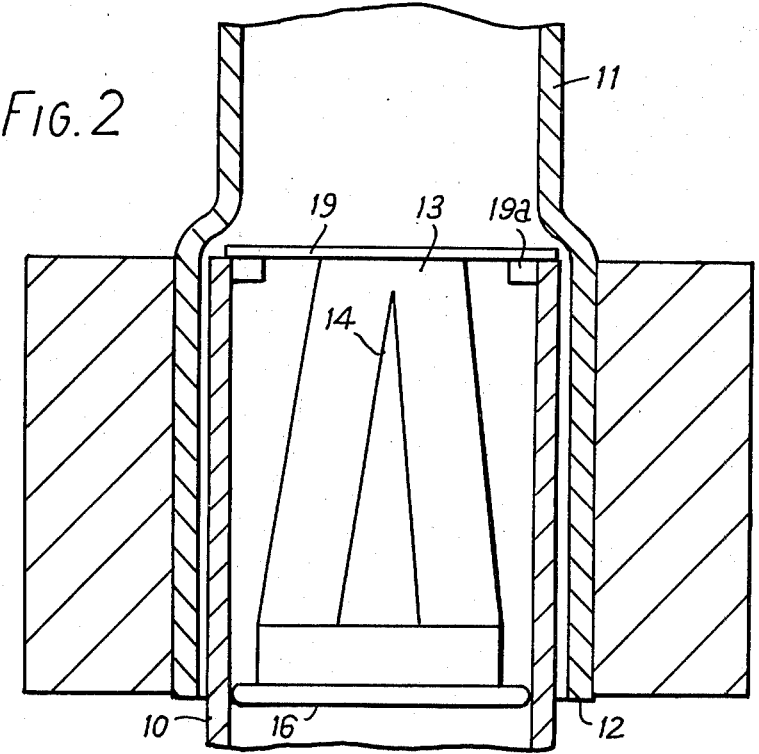
FIG. 2 shows a modification to the embodiment shown in FIG. 1 in which the pipes are in a vertical disposition.

In the arrangement illustrated in FIGS. 1 and 2 the apparatus is shown for explosively welding a pipe 10 to a further pipe 11, having a belled end 12. In FIG. 1, pipe 10 is inserted into the belled end 12 of pipe 11 and a parallel stand-off clearance is maintained between the outside surface of pipe 10 and the inside surface of belled end 12.

The explosive means comprises a frusto-conical impactor 13 made of polythene containing an explosive charge 14 in intimate contact.

Impactor 13 is spatially located by means of a plastic bobbin 15 having centralising discs 16 which maintain the impacting medium at a minimum stand-off clearance from the inside bore of pipe 10. A detonator 17 is employed to initiate the explosive charge 14. Surrounding the outside of belled portion 12 is positioned a metal anvil 18 comprising circular segments of thick metal held together by restraining means, which anvil acts to absorb the force of the explosion and prevent excessive distortion of the pipe walls.

The angle and thickness of the frusto-conical impactor, the size of the explosive charge and stand-off clearances between the impactor and the inside wall of pipe 10 and the stand-off clearance between the outside surface of pipe 10 and inside surface of belled end 12 are calculated in accordance with the wall thicknesses, diameters of the members and with the lengths of weld to be produced. The nature of the explosive charge may be either such that it produces a detonation velocity in excess of the speed of sound in that metal having the highest sonic velocity, i.e. supersonic, or else may be less than that, i.e. subsonic. It is, however, preferable to use the former.

When the charge is initiated by the detonator the wall of pipe 10 attains a sufficiently high velocity to effect a weld between its outer surface and the inner surface of belled pipe 11. The impactor, centralising discs, etc., are destroyed by the explosion and and are readily cleared from the bore on completion of the weld.

By the method described above it has been found that the stand-off distance between a pipe and the bore of a surrounding metal member to which it is to be welded may be reduced to 10% or less of the wall thickness of the pipe as compared with 50% to 100% in previously known arrangements. This enables welding to be achieved without excessive enlargement of the bores or members.

In the embodiment shown in FIG. 2 the pipes are in a vertical disposition. In this instance the impactor is centralised by means of a flat disc 19 having an inner location ring 19a at one end of pipe 10 and by disc 16 within the bore. Alternatively, the discs may be formed of a resilient rubber or else may incorporate springs to centralise the impactor. The method of welding is performed in the same manner as described with reference to FIG. 1.

Figure 3:
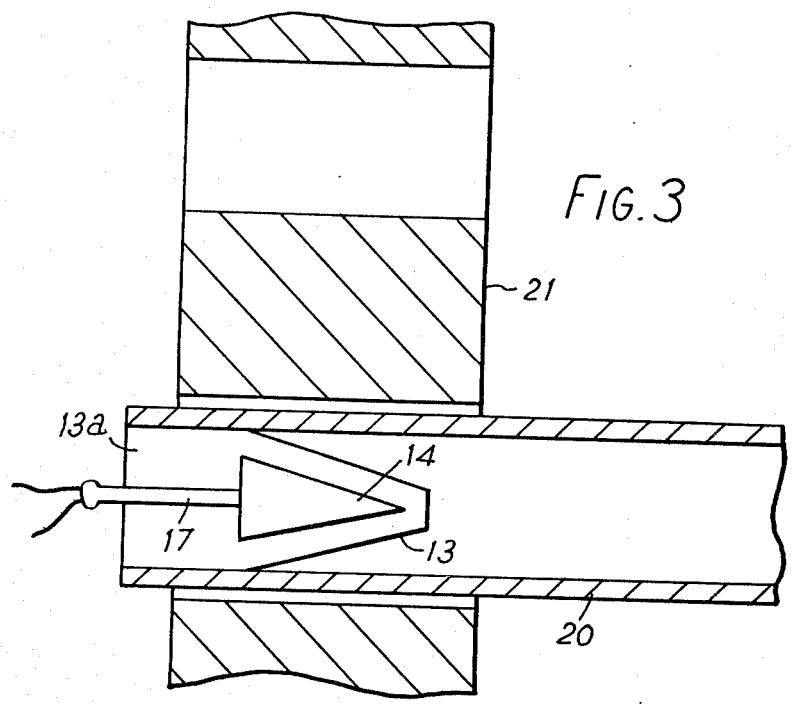
FIG. 3 shows the arrangement for explosively welding a pipe or tube to a tube plate.

In the embodiment shown in FIG. 3 the method is applied to the welding of a tube 20 to a tube plate 21. In this instance centralising discs are unnecessary since the impactor is provided with a shoulder portion 13a. In this embodiment the conical portion is preferably directed away from the end of the tube. The diameter of the tube plate bore need not be very much greater than the outside diameter of the tube since when the tube is accelerated by impact from the impactor the resultant velocity is attained much more quickly than when the tube is being accelerated directly by a gas pressure as in known arrangements. The required stand-off distance can be achieved simply by means of shims of suitable thickness.

Figure 4:
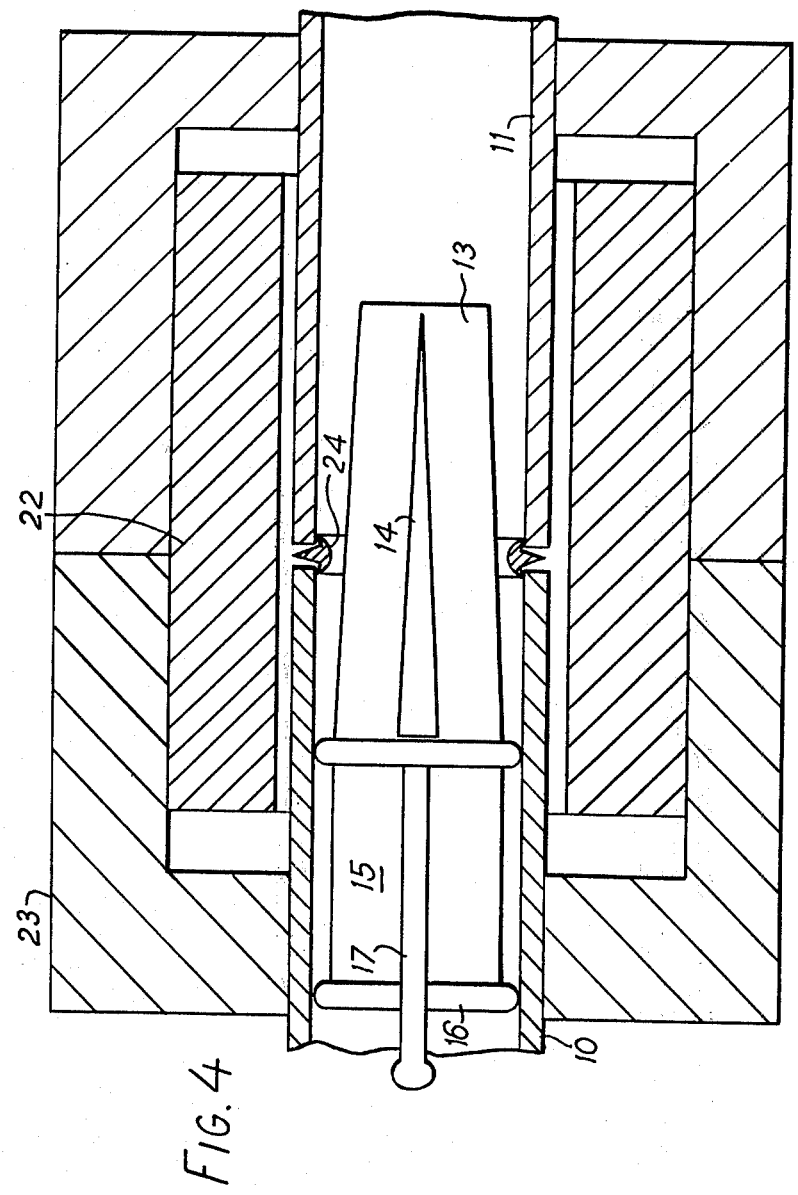
FIG. 4 shows the arrangement for explosively welding two pipes to a metal sleeve.

In the embodiment shown in FIG. 4, two pipes 10 and 11 have their adjoining ends surrounded and overlapped by a sleeve 22 and this is, in turn, surrounded by an anvil comprising a plurality of circular segments 23 which are held in position by restraining means, not shown. In this embodiment a shield ring 24, which may be metal, is held between the joint of the two pipes for the purpose of preventing the impactor extruding between the abutting pipe ends. Provision in the form of wedges may be made to maintain a parallel clearance between pipes 10, 11 and sleeve 22 or the clearance can be achieved simply by the support as shown. Detonation of the explosive charge to effect the weld is as described with reference to FIG. 1.

Figure 5:
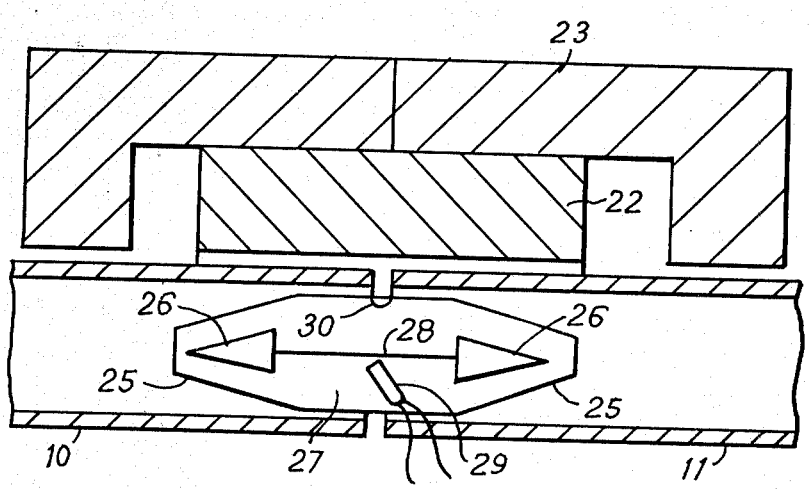
FIG. 5 shows a modification to the embodiment shown in FIG. 4.

In the embodiment shown in FIG. 5 the impactor consists of two frusto-conical portions 15 each containing a main charge 26 joined by a plain barrel section 27 which contains a small core explosive 28 initiated by a detonator 29. The barrel section, which is located in at least one of the bores by using for example, an adhesive, is provided with a radial recess 30 in the region where the joint occurs between the two pipes 10, 11 and by this configuration extrusion of the impactor into the joint region is prevented. The details of the surrounding sleeve and anvil are as described with reference to FIG. 4.

It should be noted that in all the embodiments described the detonator may be initiated locally as described or from a position remote from the explosive charge.

It should also be noted that the impactor need not be tapered as described in the specific embodiments. It may, in fact, be parallel-sided, provided that the said spatial separation be maintained between the outside surface of the impactor and the inner surface of the pipe and that a suitable charge is used. In this form the explosive charge would normally be one of sub-sonic detonation velocity.

The annulus defined by the outside surface of the pipe and the bore of the surrounding member need not be of constant width as described above, but may increase in the direction of detonation of the main charge or charges. The use of a tapering stand-off gap, however, is practically less attractive and would normally only be used if the pipe wall were very thick. It will, however, be clear that such a configuration may be employed in putting this present invention into effect.

I claim:
1. A method of explosively welding a metal pipe to a metal member having a bore to receive said pipe comprising the steps of
    i. disposing said pipe in said bore with a clearance between the outer surface of the said pipe and the wall of said bore,
    ii. locating within said pipe an impactor comprising a body of impacting medium containing an explosive charge, the surface of said body at least in the region surrounding the explosive charge being spaced from the inner surface of the pipe, and
    iii. detonating the explosive charge and thereby
    iv. imparting a high velocity to the impacting medium before it strikes the inner surface of the pipe,
    v. the impact of said impacting medium on the pipe accelerating the wall of the pipe to a velocity such that it is welded to the wall of the said bore.
2. A method as claimed in claim 1 wherein said impactor body is conically tapered in the region surrounding said explosive charge.
3. A method as claimed in claim 2 wherein said impactor body is spaced from the inner surface of the pipe by at least one annular projection on the body.
4. A method as claimed in claim 2 including the step of fitting a cylindrical portion of said impactor body within said pipe.
5. A method as claimed in claim 1 for welding the ends of two pipes to a surrounding sleeve, including the step of disposing a metal shielding member between said pipe ends to prevent extrusion of the impacting medium therebetween.
6. A method as claimed in claim 1 for welding the ends of two pipes to a surrounding sleeve in which an explosive charge is disposed within each end of said impactor body and each of said ends is conically tapered from a cylindrical centre section of larger diameter.
7. A method as claimed in claim 6 wherein said impactor body is formed with an annular recess at its centre in alignment with the gap between the ends of the pipes.
8. A method as claimed in claim 6 wherein a metal shielding ring is disposed between said pipe ends to prevent extrusion of the impacting medium through the gap between the pipe ends.
9. A method as claimed in claim 2 in which the explosive charge is conically tapered.
10. A method as claimed in claim 1 in which the explosive charge has a supersonic detonation velocity.

* * * * *